Sept. 20, 1971  G. SZEKELY  3,605,697
AUTOMATIC FEEDERS FOR AQUARIUMS
Filed July 24, 1969
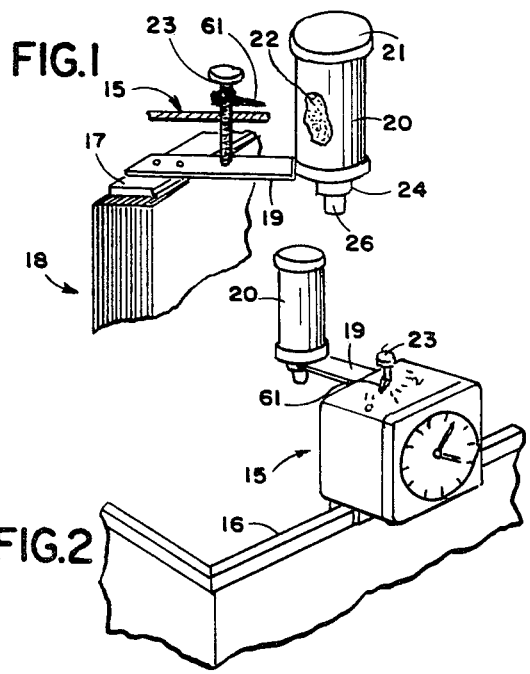
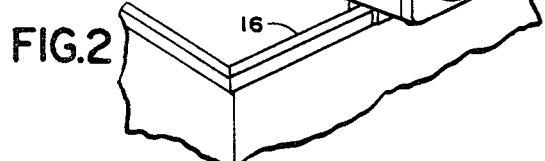
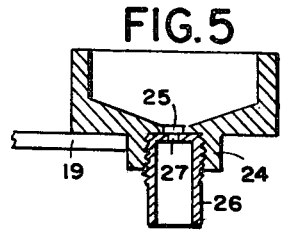
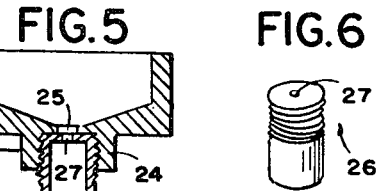
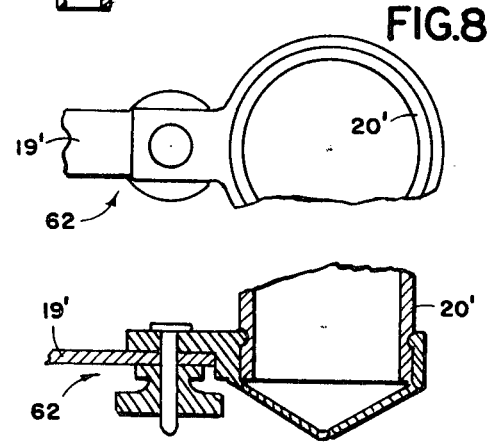
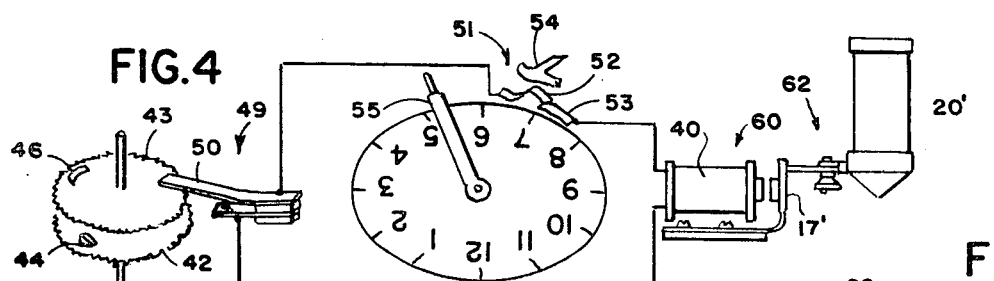
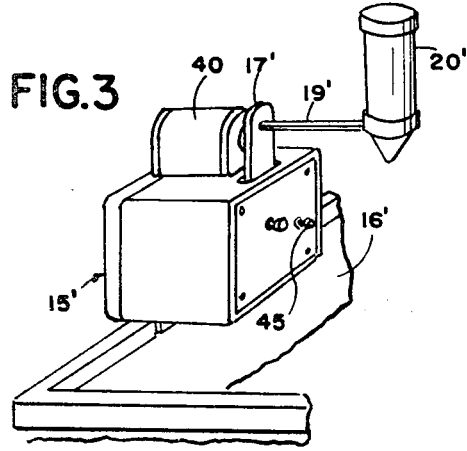
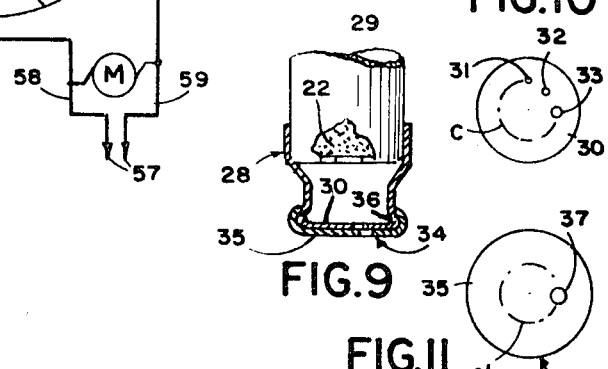
INVENTOR,
George Szekely,
BY
ATTORNEY United States Patent Office 3,605,697
Patented Sept. 20, 1971

3,605,697
AUTOMATIC FEEDERS FOR AQUARIUMS
George Szekely, 3123 Bailey Ave.,
New York, N.Y. 10463
Filed July 24, 1969, Ser. No. 844,393
Int. Cl. A01k 5/00
U.S. Cl. 119—51.11                                6 Claims

ABSTRACT OF THE DISCLOSURE

A container of granular food is suspended over a fish tank, from that member of an alarm clock mechanism which vibrates to make a noise at alarm time; the duration of the alarm being a fraction of a minute. Either the clock operates in this manner, or an ordinary electric alarm clock, whose alarm duration is usually about forty minutes, is modified to reduce such interval to about ten to fifteen seconds. The discharge orifice at the bottom of the container may be changed to accommodate a food supply of different fineness. The container may be replaceable, refillable, or constitute a cartridge to be received in an adaptor. When the clock is of the electrically operated type, said vibrating member is the armature of a buzzer, upon the operation of which, the container is shaken.

---

The present invention relates to automatic feeders for aquariums.

Fish in tanks should not be fed at one time more than they can completely consume. To provide in one feeding, food sufficient to last several days, will result in overfeeding and fouling of the tank, which kill more fishes than from any other cause. Fish should be fed regularly twice a day, the feeding being usually effected by manually shaking a food container to sprinkle some of its contents into the tank. The quantity dispensed was always a guess, and regularity of feeding is very often difficult to attend to because of the owner's absence.

Many proposals have heretofore been advanced for automatic fish feeders, but none of these could reach widespread distribution because of their unreliability and high cost.

It is therefore the principal object of this invention to provide a novel and improved automatic fish feeder which carries out the feeding with the punctuality and reliability of a clockwork, and further, the required quantity of food is dispensed evenly and in measured amounts by my new apparatus which in cost is not essentially higher than that of commercial alarm clocks, and thus will be suitable for the great mass of fish hobbyists. Another object thereof is to provide that the food supply containers shall be automatically shaken by means driven by a clockwork which shall actuate same at predetermined time intervals and issue predetermined and equal amounts of food each time. Further, the said containers shall be either replaceable, refillable, or in the form of a cartridge to be set into an adaptor therefor.

Another object thereof is to provide for change in the size of the discharge aperture, which is in the container's bottom, so granular foodstuff of various fineness may be dispensed.

A further object thereof is to have the feeder controlled by an alarm clock mechanism which will shake the container during each alarm period which should last from between ten to fifteen seconds, and if the clock mechanism used is an ordinary commercial electric alarm clock whose usual alarm period lasts for about forty minutes, this invention provides for easy modification thereof to reduce the operation of the alarm mechanism to a period of from ten to fifteen seconds which is found ample.

Another object thereof is to provide a novel and improved automatic feeding device of the character described, which is simple in construction, reasonable in cost, easy to manufacture, easy to adjust and replenish, and efficient in carrying out the purposes for which it is designed.

Other objects and advantages will become apparent as this disclosure proceeds.

For one practice of this invention, that element of an A.C. alarm clock, which is set to vibrate to create noise for a given interval at a predetermined time, twice in twenty-four hours, his suspended therefrom over a fish tank, a container holding a supply of granular fish food, which trickles through a discharge orifice in the container's bottom, during such vibration. Either the clock which is mounted on the tank, has an alarm period of a required fraction of a minute, or else an ordinary A.C. alarm clock is modified to reduce the usual alarm interval of about forty minutes to about ten to fifteen seconds. This is done by making the minute hand, the operating member of a switch which is interposed in parallel connection with a switch controlled by the clock's alarm mechanism, for control of a buzzer circuit. Provision is made to change the discharge orifice of the supply container so foods of various fineness grades can be used. The container may be replaceable, refillable or constitute a cartridge to be received in an adapter on said vibrating element.

In the accompanying drawing forming part of this specification, similar characters of reference indicate corresponding parts in all the views.

FIG. 1 is a fragmentary perspective view showing a food container mounted on the armature of the buzzer of an electric alarm clock, provided with means to adjust the intensity of vibration. This illustrates an embodiment in accordance with teachings of this invention.

FIG. 2 is a fragmentary perspective view of an automatic feeding apparatus of which FIG. 1 is a part, mounted in use on a fish tank. The clock employed has an alarm duration of from ten to fifteen seconds, twice every twenty-four hours.

FIG. 3 is a fragmentary perspective view of another embodiment of this invention, in which the clock used is of the electrically-operated type, commonly on the market, but here modified so its alarm duration which is usually about forty minutes, is made to be from about ten to fifteen seconds.

FIG. 4 is a part pictorial and part diagrammatic showing of the alarm mechanism fragmentarily, and of the electrical control circuit of the alarm system of the apparatus shown in FIG. 3.

FIG. 5 is a fragmentary enlarged central section of an adapter shown in FIG. 1, for holding a cartridge-form of food supply. The discharge orifice is in a separate element.

FIG. 6 is a perspective view of said separate element mentioned in the description of FIG. 5.

FIG. 7 is an enlarged fragmentary sectional view of a replaceable food container as shown in FIG. 4.

FIG. 8 is a top plan view of FIG. 7.

FIG. 9 is an enlarged sectional view of a food container adaptor for holding a cartridge food supply, with provision to change the size of the discharge aperture, by having rotatably associated elements in superposed relation which have predetermined arrangement of apertures therethrough.

FIGS. 10 and 11 are bottom views of said superposed elements shown separately, respectively.

In the drawing, the numeral 15 designates generally an alarm clock clamped onto the top edge of a wall of a fish tank 16. That member of the clock mechanism which vibrates during the alarm period, which in an electric clock is the armature 17 of a buzzer denoted generally by the numeral 18, has secured thereto a blade or arm 19 extending to one side thereof to be over the tank, in the manner of a cantilever, which at distal end, carries an upright container 20, having a removable cover 21, so the container can be filled with granular food stuff 22, and of course, such supply can be replenished when required. The alarm mechanism is one whose operating period is of a predetermined duration, from ten to fifteen seconds. An adjustment screw 23 may be provided, to regulate the shaking stroke and intensity of vibration. In the embodiment shown in FIG. 1, a downward nipple 24, extends from the bottom wall of the container around the central aperture 25 through said wall, and is interiorly threaded to receive an exteriorly threaded inverted shell 26, having an aperture 27 which is communicative with the aperture 25 and coaxial therewith. Said aperture 27 is of a size to suit granular foodstuff of a given fineness. A set of three such shells, each having apertures of different sizes, may be provided, so the one mounted, is for a fineness required for the foodstuff used. The change in discharge aperture size may be provided by an adaptor 28 for a cartridge containing foodstuff, as 29, or as the bottom of a container. The bottom of such adaptor has a bottom wall 30 provided with three apertures 31, 32, 33 of different sizes, arranged spaced around a circle C. The numeral 34 denotes a cap rotatably mounted on the enlargement 36, so the walls 30 and 35 are in superposed relation. The wall 35 has a hole larger than those in the wall 30, on the circle C' whose diameter is that of the circle C. It is evident that turning the cap, affords change in that aperture in wall 30, which shall be communicative with aperture 37 in wall 35.

It is practical to use an ordinary commercial electric alarm clock in the practice of this invention. It can be easily altered for use in the system shown in FIG. 4, where the food container 20' is to be shaken a predetermined interval of between 10 to 15 seconds, at the set alarm time, although the clock's alarm duration is about 40 minutes. This is here done by removing the armature of the clock's buzzer means, and providing a buzzer comprising an electro-magnet 40, having its own armature 17', to carry the food container 20' on the arm 19', and to provide the switches as will be set forth, arranged in the circuit shown.

A well known scheme usually used in the commercial clock to control alarm occurrence, includes the two coaxial gears 42 and 43. The gear 42 has a cam 44; the position of this gear being determined by the alarm time, set by the alarm-time-setting control knob 45 of the clock. The gear 43 has an opening, the slot 46; said gear turning with the clock's hour hand. Spring means, not shown, biases the gear 43 towards the gear 42, so normally, the gear 43 rests against the cam, and shall be so deemed, because only for purposes to attain clarity of illustration, are these gears shown apart in the drawing. When alarm time commencement arrives, the cam will enter said opening 46, thereby permitting the gear 43 to come in face-to-face contact with the gear 42. This released the clock buzzers armature for movement, which was stopped about 40 minutes later, because the cam 44 did then accomplish its complete withdrawal from the slot opening 46, and had raised the gear 43, so again, the clock buzzer's armature was held fixed. In the system of FIG. 4, this movement of the gear 43 onto the face of the gear 42, is utilized to permit the switch 49 to close, and their separation is utilized to make said switch 49 to open. It is to be noted that one switch element is a flexed conductive strip 50, which pushes the gear 43 towards the gear 42, and may even supplant the spring means initially provided therefor in the clock 15'. Said switch 49 is within the clock's casing. A convenient position within said casing for another required switch 51, is in the region of the numeral 7 on the clock's face. This switch 51 is comprised of the normally separated springy conductive elements 52 and 53, so positioned, that when the clock's minute hand 55 is at said numeral, it shall be guided by the cantilever spring eleemnt 54, to cause the elements 52 and 53 to be in contact and such contact be held for the predetermined period of seconds that the buzzer 56 is to be actuated.

In the circuit, the clock's motor M is connected across the power lines. Also, the switches 49, 52 and the buzzer's electro-magnet 40, are connected in series to constitute a group; the terminals of such group being connected across the power lines. Since it is usual for the clock to have an electrical connection cord comprising the conductors 58 and 59 terminating in male plug adapted for connection to a power outlet, the arrows 57, may be deemed to designate the prongs of such plug.

It is evident that the buzzer 60 will operate only during each interval when both switches 49 and 51 are closed, and that the closing of the switch 51 takes place always at 35 minutes past each hour and is kept closed some predetermined interval between 10 and 15 seconds. The closing time for the switch 49 takes place at the time set by the manipulation of the knob 45, and lasts about 40 minutes, and such setting shall be for a time of between 7:15 and 7:30, so the feeding period shall commence at 7:35 which is a practical feeding time. This of course will occur automatically, twice daily, and the dispensing of food can thus be provided for, allowing the owner to stay away for considerable lengths of time as is occasioned by his trips and vacations, or other absences.

Other positions for the switch 49 are possible, as for instance having it positioned so it is operated by the hour hand, in a similar manner as the switch 51 is dealt with by the minute hand; such switch 49, being so positioned that the hour closes it a bit before or when one hand is directly above the other at the position of the switch 51. In such construction which is not shown, but believed readily understood by those versed in the electro-mechanical arts, the clock used need not be an alarm clock.

Dealers in fish food supplies can package them in masses of different fineness, whose dispensing by a definite feeder made in accordance with this invention, has been tested and data noted as to fineness of feed, size of orifice through which the discharge is made, and the resulting quantity of food discharged in one feeding. This data can be furnished in the form of a chart to owners of such tested feeders. Another factor which may be included in such data, is the setting of the pointer 61, which determines the scope and intensity of the shaking stroke of the food container.

The container 20 may be fixed to the element 19, and have a removable cover 21, so it can be replenished with the granular food stuff 22 which is marketed loose. Or, a filled container 20' of plastic, after its cover is removed from bottom end, may be snapped into an adaptor 62 removed from the element 19', and then such laden adaptor remounted, and secured by a screw and nut means 62. Or, the food supply may be packaged in cartridges as 29, to be set into an adaptor therefor, after puncturing or otherwise providing a substantial opening in its envelope. It is to be noted, that in use, the food supply is maintained both air and moisture-tight, and any clogging of discharge orifices would be undone, at the commencement of buzzer operation.

Another manner for adjusting the intensity of the shaking stroke, would be to interpose a variable resistance, not shown, in the circuit of the buzzer 60, which is believed readily understood without the need for further illustration. The clock may be specially made for these feeders with a fixed setting to accomplish initiation of the closing of the switch 49, at a predetermined time, and its outer casing may be of a size so that the electro-magnet 40 shall be housed therein.

The modes of operation of the feeders illustrated, are believed sufficiently set forth in the above description, and hence need no further explanation, except to mention that in the system of FIG. 4, the switch 51 is closed only once in each 40 minute period in which the switch 49 is closed.

It is to be noted that the motor M is an A.C. synchronous motor, and hence the frequency of the vibrations imparted to the container of the food supply, is a constant, and during every run, the intensity of the vibrations are also equal respectively. Hence for any given size of orifice and fineness of foodstuff, the quantity dispensed at each feeding time can be ascertained by actual trial, and such data compiled into a chart, can be furnished buyers of the feeder apparatus.

This invention is capable of numerous forms and various applications without departing from the essential features herein disclosed. It is therefore intended and desired that the specific showings and description herein shall be deemed merely illustrative and not restrictive.

I claim:

1. In an automatic feeder for an aquarium, a clock having means including an element which is automatically vibrated at a predetermined time for a predetermined period, said means including an electric buzzer having an electro-magnet associated with an armature which is made to vibrate upon actuation of said electro-magnet; said armature being the mentioned element, and a container for a granular food supply, having a discharge orifice, arranged to move with said armature whereby said container is shaken; said container being positioned so that any discharge therefrom shall enter the aquarium.

2. An automatic feeder as defined in claim 1, wherein the container has an opening, and including a member releasably mounted on the container across said opening; said discharge orifice being in said member.

3. An automatic feeder as defined in claim 1, wherein the container includes means for changing the size of the discharge orifice.

4. An automatic feeder as defined in claim 1, wherein the clock is of the type in which said element is set to vibrate once every twelve hours.

5. An automatic feeder as defined in claim 1, including means adapted to adjust the intensity of the vibrations.

6. An automatic feeder as defined in claim 1, wherein the clock is an electric alarm clock including and driven by an electric motor, and having means in its alarm mechanism including a movably mounted member which is at a normal rest position, and away from such position for a period of a plurality of minutes including the interval during which the said armature is vibrating, and including a first normally open switch including a flexible component positioned in the path of the minute hand of said clock; said hand in its movement, being adapted to contact and move said flexible component whereby the first switch is made to assume closed condition while said hand contacts said flexible component; the period of time such contact continues being a predetermined part of a minute, a second switch in open condition while said member is at its normal rest position, and arranged to assume closed condition by a movement of said member away from its normal rest position; said switches and electro-magnet being connected in series to constitute a group; the terminals of said group being connected respectively to the terminals of said motor, and means for connecting a source of electrical energy across said terminals.

References Cited

UNITED STATES PATENTS

| | | | |
|---|---|---|---|
| 2,725,852 | 12/1955 | Cramer | 119—5X |
| 2,800,256 | 7/1957 | Nuzzo | 119—5UX |
| 3,022,767 | 2/1962 | Malek | 119—51.11 |
| 3,221,560 | 12/1965 | Kosa et al. | 222—161X |
| 3,416,497 | 12/1968 | Riel | 119—51.11 |

HUGH R. CHAMBLEE, Primary Examiner